United States Patent [19]

Isono et al.

[11] Patent Number: 5,665,254
[45] Date of Patent: Sep. 9, 1997

[54] METHOD OF MANUFACTURING A REINFORCING BAR CAGE AND APPARATUS FOR MANUFACTURING THE SAME

[75] Inventors: Hideo Isono, Nishinomiya; Takeshi Okabe, Hirakata, both of Japan

[73] Assignees: Matsumura-Gumi Corporation, Osaka; Daiichi Unyusagyo Co. Ltd., Nishinomiya, both of Japan

[21] Appl. No.: 509,339

[22] Filed: Jul. 31, 1995

[30] Foreign Application Priority Data

Apr. 12, 1994 [JP] Japan .................. 6-73052

[51] Int. Cl.$^6$ .................. B23K 11/34; B21F 27/10
[52] U.S. Cl. .................. 219/56; 29/897.34; 140/112
[58] Field of Search .................. 219/56, 57, 58; 29/897.34; 140/112

[56] References Cited

U.S. PATENT DOCUMENTS

| 3,101,526 | 8/1963 | Paullus et al. | 140/112 |
|---|---|---|---|
| 3,209,793 | 10/1965 | Miura | 140/112 |
| 3,233,638 | 2/1966 | Silliman et al. | 140/112 |
| 3,752,949 | 8/1973 | Nordgren | 219/56 |
| 3,837,372 | 9/1974 | Bernot | 140/112 |
| 4,018,251 | 4/1977 | Mundel et al. | 140/112 |
| 4,538,042 | 8/1985 | Tanaka et al. | 219/58 |
| 4,658,867 | 4/1987 | Hasak | 140/112 |
| 5,271,436 | 12/1993 | Pfender et al. | 140/112 |

FOREIGN PATENT DOCUMENTS

| 561007 | 9/1993 | European Pat. Off. | 140/112 |
|---|---|---|---|
| 2365386 | 5/1978 | France | 140/112 |
| 2720970 | 11/1978 | Germany | 140/112 |
| 49-113759 | 10/1974 | Japan . | |
| 6-134540 | 5/1994 | Japan . | |
| 6-126362 | 5/1994 | Japan . | |
| 6-167019 | 6/1994 | Japan . | |
| 547270 | 2/1977 | U.S.S.R. | 140/112 |
| 590254 | 1/1978 | U.S.S.R. | 140/112 |
| 639635 | 12/1978 | U.S.S.R. | 140/112 |
| 1382554 | 3/1988 | U.S.S.R. | 140/112 |

OTHER PUBLICATIONS

"Yosetsu Kogaku Gairon" (pp. 150–157) by Yugoro Ishi and Hiroshi Tamura, 1st version, 3rd Print, published by Kyoritsu Shuppan Kabushiki Kaisha.

*Primary Examiner*—Teresa J. Walberg
*Assistant Examiner*—J. Pelham
*Attorney, Agent, or Firm*—Nikaido, Marmelstein, Murray & Oram LLP

[57] ABSTRACT

A method of manufacturing a reinforcing bar cage, which is used in a cast-in-place piling method of constructing a reinforced concrete pile for a structure, and an apparatus for manufacturing the same, which allow simple and easy manufacturing of a reinforcing bar cage having an intended cage strength. A hoop is disposed, e.g., spirally with respect to cylindrically arranged main reinforcements, connection between the main reinforcements and the hoop is made by welding crossed portions thereof, and, in connection with the welding, the crossed portions are heated to achieve an intended strength of the reinforcing bar cage.

18 Claims, 8 Drawing Sheets

METHOD OF MANUFACTURING A REINFORCING BAR CAGE AND APPARATUS FOR MANUFACTURING THE SAME

BACKGROUND OF THE INVENTION

1. Field of the Invention

The present invention relates to a method of manufacturing a reinforcing bar cage, which is used in a cast-in-place piling method for constructing a reinforced concrete pile for a structure, as well as an apparatus for manufacturing the same.

2. Description of the Background Art

As a method of constructing reinforced concrete piles for structures, there is known a precast piling method in which piles are precast in a factory or the like and are transported to a site and are driven into the ground thereof, and also there is known a so-called cast-in-place piling method in which reinforcing bar cages are disposed in the holes formed in a ground, and concrete is cast thereinto.

Between these methods, the precast piling method facilitates the construction of piles because it is allowed to use the precast piles transported to the site from another place, but suffers from disadvantages in view of storage and transportation of the heavy precast piles. Also, a diameter and a length of the pile may be restricted in view of storage and transportation of the pile, so that a large number of precast piles must be driven in some cases due to conditions such as a state of ground and a weight of a structure or the like, which unpreferably increases a required time, a number of steps and noises.

Meanwhile, the cast-in-place piling method neither requires storage and transportation of heavy piles nor makes large noises. Also this method allows appropriate selection of the diameter, length, number of piles or the like in accordance with conditions such as a state of the ground and a weight of the structure, and a required number of piles can be formed within a relatively short time in contrast to the precast piling method which requires a long time and a large number of steps for the piling operation itself. Accordingly, the cast-in-place piling method is nowadays employed in many cases.

However, the cast-in-place piling method requires reinforcing bar cages functioning as reinforcing bars. The reinforcing bar cages are manufactured in a factory or on-site. In either case, the manufacturing thereof is difficult and dangerous, and requires a great deal of skill and a long time. More specifically, the reinforcing bar cage for the cast-in-place pile includes arranged rings usually made of steel belts and defining the inner periphery of the cage. A predetermined number of main reinforcements (longitudinal bars) are arranged parallel in a predetermined angular space around the rings and welded to the rings. Around the main reinforcements, hoops which are longitudinally spaced from each other are wound in a ring-like fashion and are bound to the main reinforcements at crossings thereof with binding wires. Since the cage must be manufactured under the predetermined configuration with heavy main reinforcements and hoops to be manually handled, the manufacturing is difficult and dangerous, and requires a great deal of skill and a long time. Although the manufacturing requires skilled persons for welding and assembling the reinforcing bar cage, it is nowadays difficult to employ such skilled persons.

In order to simplify and facilitate the manufacturing of the reinforcing bar cage, such a structure may be envisaged that the hoops are attached to the main reinforcements by spot-welding the hoops to the main reinforcements at their crossings. However, the reinforcing bars, and particularly main reinforcements used for the cast-in-place piles cause such a phenomenon that the welded portion hardens (its extensibility decreases) due to the heat applied by the welding and the natural rapid cooling after the welding, so that an intended strength cannot be achieved. Although such a reinforcing bar may be used that no problem is caused by the welding, it results in increase of a cost of the reinforcing bar cage.

SUMMARY OF THE INVENTION

Accordingly, it is a first object of the invention to provide a method of manufacturing a reinforcing bar cage, which allows simple and easy manufacturing of the reinforcing bar cage used in a cast-in-place piling method of constructing a reinforced concrete pile for a structure as compared with a conventional case in which hoops are bound to main reinforcements with binding wires, and can achieve an intended cage strength without substantially increasing a cost of material used for the cage.

It is a second object of the invention to provide a method of manufacturing a reinforcing bar cage and an apparatus for the same, which allow simple and easy manufacturing of the reinforcing bar cage used in a cast-in-place piling method of constructing a reinforced concrete pile for a structure as compared with a conventional case in which hoops are bound to main reinforcements with binding wires, can achieve an intended cage strength without substantially increasing a cost of material used for the cage, and allow laborsaving and efficient manufacturing with safety and high accuracy.

For achieving the first object, a method (first method) of manufacturing a reinforcing bar cage according to the invention includes the steps of arranging main reinforcements in a cylindrical form, and arranging and connecting a hoop to the cylindrically arranged main reinforcements. Connection between the main reinforcements and the hoop is made by welding crossed portions of the main reinforcements and the hoop. In connection with this welding, the crossed portions are heated.

In the above method, positions and numbers of the crossed portions of the main reinforcements and the hoop to be welded are not restricted provided that a finished reinforcing bar cage has an intended strength, and typically, the crossed portions of each main reinforcement and each hoop may be welded in order to maintain a sufficient strength and an intended configuration of the reinforcing bar cage.

The heating of the crossed portions is performed for the purpose of achieving an intended strength of the reinforcing bar cage by preventing hardening and reduction of extensibility of the welded portions of reinforcing bars and particularly main reinforcements, which may be caused by the welding. For example, the heating may be performed immediately before or after the welding. The heating also may be performed at one or combination of timing immediately before, immediately after and during the welding.

A method of welding the crossed portions is not specifically restricted, and may be spot welding such as arc welding or resistance welding in view of an efficiency of welding operation and suppression of sectional deformation of the reinforcing bars caused by the welding.

The cylindrical arrangement of the main reinforcements may be performed in various manners, and for example, in such a manner that (1) the parallel main reinforcements are arranged around and welded to a ring made of steel belt allowing welding of the main reinforcements thereto, which is similar to the conventional method, or that (2) an appropriate means for cylindrically arranging and supporting main reinforcements is prepared, and the main reinforcements are cylindrically arranged and supported by this means without using the above ring.

The arrangement of the hoop with respect to the main reinforcements may be effected in various manners, and for example, by individually arranging the hoops around the main reinforcements, or by spirally and longitudinally arranging a continuous hoop around the main reinforcements.

In order to achieve the second object, a method (second method) of manufacturing a reinforcing bar cage according to the invention includes the steps of arranging main reinforcements in a cylindrical form; moving a group of the main reinforcements in a longitudinal direction of the main reinforcement while rotating the group in a predetermined direction, and supplying a continuous hoop to the group of the moving and rotating main reinforcements for spirally winding the hoop around the group; and successively welding crossed portions of the hoop and the main reinforcements with a welding device which confronts the group of the main reinforcements, can rotate a predetermined angle from a predetermined position in the same direction as the group of the main reinforcements and can return to the predetermined position. In connection with the welding, the crossed portions are heated by a heating device which is disposed near the welding device and can reciprocatively rotate in the same direction as the welding device.

In order to achieve the second object, an apparatus for manufacturing a reinforcing bar cage according to the invention comprises:

a device for supplying main reinforcements;

a main reinforcement supporting and rotating device for cylindrically arranging and supporting the main reinforcements supplied from the main reinforcement supplying device, and rotating a group of the supported main reinforcements while allowing movement of the group of the main reinforcements in a longitudinal direction of the main reinforcement;

a main reinforcement pull-out device for pulling out the group of the main reinforcements supported by the main reinforcement supporting and rotating device from the main reinforcement supporting and rotating device by moving the main reinforcement group in the longitudinal direction of the main reinforcement while holding an end of the main reinforcement group and rotating the same together with the main reinforcement supporting and rotating device;

a hoop supplying device for supplying a continuous hoop to the main reinforcement group which is supported by the main reinforcement supporting and rotating device and the main reinforcement pull-out device and is being rotated and pulled out from the main reinforcement supporting and rotating device;

a hoop pushing device which confronts the main reinforcement group supported by the main reinforcement supporting and rotating device, can rotate a predetermined angle in the same direction as the main reinforcement group from a predetermined position, can return to the predetermined position, and is operable to push the hoop supplied from the hoop supplying device against an outer surface of the main reinforcement group;

a welding device which confronts the main reinforcement group supported by the main reinforcement supporting and rotating device, can rotate a predetermined angle in the same direction as the main reinforcement group from a predetermined position, can return to the predetermined position, and is operable to weld crossed portions of the main reinforcements and the hoop pushed against the main reinforcement group by the hoop pushing device; and a heating device which is disposed near the welding device, can reciprocate in the same direction as the welding device, and is operable to heat the crossed portions of the hoop and the main reinforcements in connection with the welding.

Also in the second method and the apparatus, positions and numbers of the crossed portions of the main reinforcements and the hoop to be welded are not restricted provided that a finished reinforcing bar cage has an intended strength, and typically, the crossed portions of each main reinforcement and each hoop may be welded in order to maintain a sufficient strength and an intended configuration of the reinforcing bar cage.

The heating of the crossed portions is performed for the purpose of achieving an intended strength of the reinforcing bar cage by preventing hardening and reduction of extensibility of the welded portions of the reinforcing bars and particularly the main reinforcements which may be caused by the welding. For example, the heating may be performed immediately before or after the welding. The heating also may be performed at one or combination of timing immediately before, immediately after and during the welding.

Further, a method of welding the crossed portions is not specifically restricted, and may be spot welding such as arc welding or resistance welding in view of an efficiency of welding operation and suppression of sectional deformation of the reinforcing bars caused by the welding.

The main reinforcement supplying device in the apparatus for manufacturing the reinforcing bar cage according to the invention may selectively have various structures, and as an example having a compact structure, it may include a main reinforcement table on which a plurality of the main reinforcements are disposed parallel to a line extending from the main reinforcement supporting and rotating device toward the main reinforcement pull-out device; a first transporting device for transporting one by one the main reinforcements supplied from the main reinforcement table; a device for positioning a leading end of the main reinforcement supplied from the first transporting device at a constant position; a second transporting device for transporting the positioned main reinforcement to a rear side of the main reinforcement supporting and rotating device; and a device for feeding the main reinforcement supplied from the second transporting device to the main reinforcement supporting and rotating device.

The main reinforcement supporting and rotating device may selectively have various structures provided that it can rotate the main reinforcement group while supporting the cylindrically arranged main reinforcements and allowing movement of the supported main reinforcement group in the longitudinal direction of the main reinforcement. For example, the device may have a structure including a rotary member having a plurality of main reinforcement insert apertures for cylindrically arranging and supporting the main reinforcements and a drive device for rotating the rotary member, in which case the main reinforcement insert apertures may be define, e.g., by pipes, Or may be apertures directly formed at a block member. It may be envisaged that the hoop pushing device, the welding device and the heating device are supported by a supporting member which is disposed near the rotary member and can be rotated concentrically with the rotary member, and this member is reciprocatively rotated by a drive device. Further, the hoop pushing device may include an inner supporting member supported by the rotary member in the main reinforcement supporting and rotating device and supporting an inner side of the main reinforcement group. In this case, if it is necessary or desired to provide the welding device with an electrode which is to be in contact with the reinforcing bars, the inner supporting member may function as the electrode. The hoop pushing device, the welding device and the heating device are not restricted to the above structures, and may selectively employ various structures provided that they satisfy the above requirements.

The main reinforcement pull-out device may selectively have various structures provided that it can move in the longitudinal direction of the main reinforcement to pull out the main reinforcements from the main reinforcement supporting and rotating device while supporting the end of the main reinforcement group and rotating the same together with the main reinforcement supporting and rotating device, and, for example, may include a rotary member provided with circularly arranged chucks for disengagably holding the main reinforcements, a drive device for the rotary member and a carriage supporting the rotary member as well as the drive device and operable to run on a rail extending in the longitudinal direction of the main reinforcement from the main reinforcement supporting and rotating device.

The apparatus for manufacturing the reinforcing bar cage may be provided with one or more auxiliary supporting devices for rotatably supporting a lower side of the reinforcing bar cage supported between the main reinforcement supporting and rotating device and the main reinforcement pull-out device while allowing rotation of the reinforcing bar cage, the auxiliary supporting devices being disposed along a path of the main reinforcement pull-out device and being vertically movable between a position for supporting the reinforcing bar cage and a returned position not impeding the movement of the main reinforcement pull-out device. In this case, each auxiliary supporting device may include, for example, a plurality of rollers which can be rotatably in contact with the lower portion of the reinforcing bar cage.

According to the method and apparatus for manufacturing the reinforcing bar cage of the invention, the hoop is arranged and connected to the cylindrically arranged main reinforcements. The connection between them is simply and easily made by welding the crossed portions of the main reinforcements and the hoop. In connection with this welding, the crossed portions are heated to attain the intended reinforcing bar cage strength.

According to the second method and the apparatus for manufacturing the reinforcing bar cage of the invention, the hoop is arranged with respect to the group of the cylindrically arranged main reinforcements in such a manner that the main reinforcement group is rotated in the predetermined direction and is simultaneously moved in the longitudinal direction of the main reinforcement, the continuous hoop is supplied to the rotating and moving main reinforcement group and is spirally wound around the same, the crossed portions of the hoop and the main reinforcements are successively welded, and, in connection with the welding, the crossed portions are heated by the heating device arranged near the welding device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will be described below with reference to the drawings. All the drawings show an example of an apparatus for manufacturing a reinforcing bar cage as well as a manner for implementing a method according to the invention by the apparatus.

Figure 1:
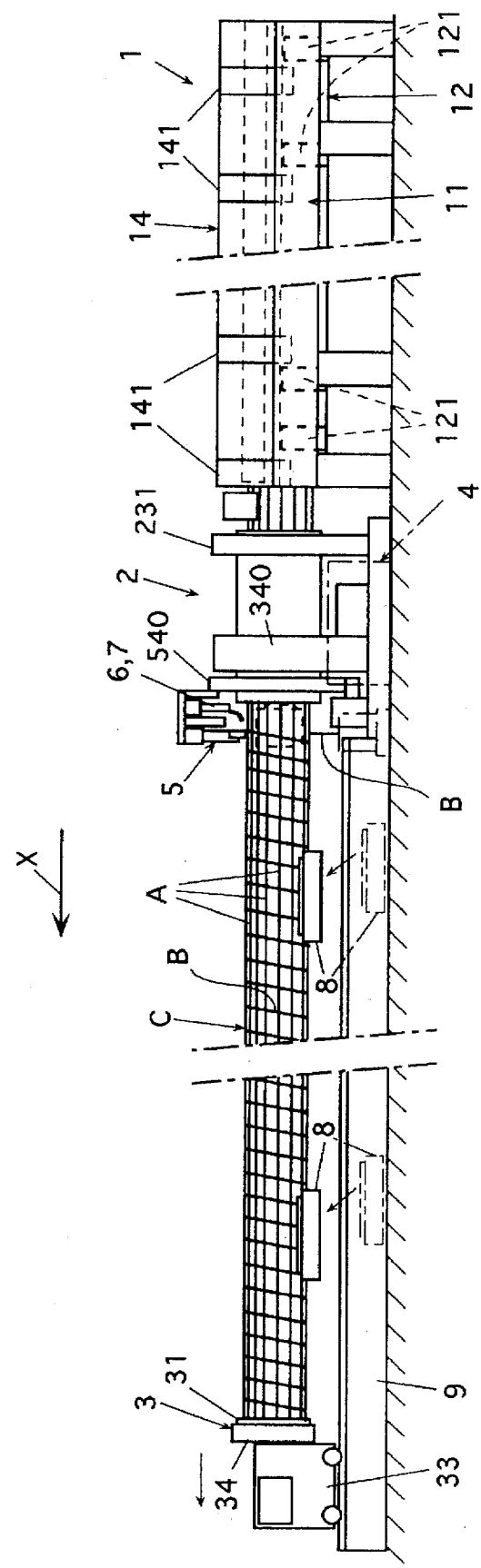
FIG. 1 is a fragmentary schematic side view of a whole structure of an apparatus for manufacturing a reinforcing bar cage according to the invention.

The apparatus for manufacturing the reinforcing bar cage shown in FIG. 1 includes a main reinforcement supplying device 1 for supplying main reinforcements A, a main reinforcement supporting and rotating device 2 continuous thereto, a main reinforcement pull-out device 3 which can run along a base frame 9 extending forward from the device 2, a hoop supplying device 4 which supplies a continuous hoop B to a group of the main reinforcements A supported by the main reinforcement supporting and rotating device 2 and the main reinforcement pull-out device 3, and pulled out from the device 2; a hoop pushing device 5 for pushing the supplied hoop B against an outer surface of the group of the main reinforcements A; welding devices 6 for welding the pushed hoop B to the main reinforcements A, heating devices 7 for heating crossed portions of the hoop and the main reinforcements in connection with the welding, and a plurality of auxiliary supporting devices 8 arranged within the frame 9 and supporting a lower side of the reinforcing bar cage C. These will be described below in detail.

(1) Main Reinforcement Supplying Device 1

Figure 2:
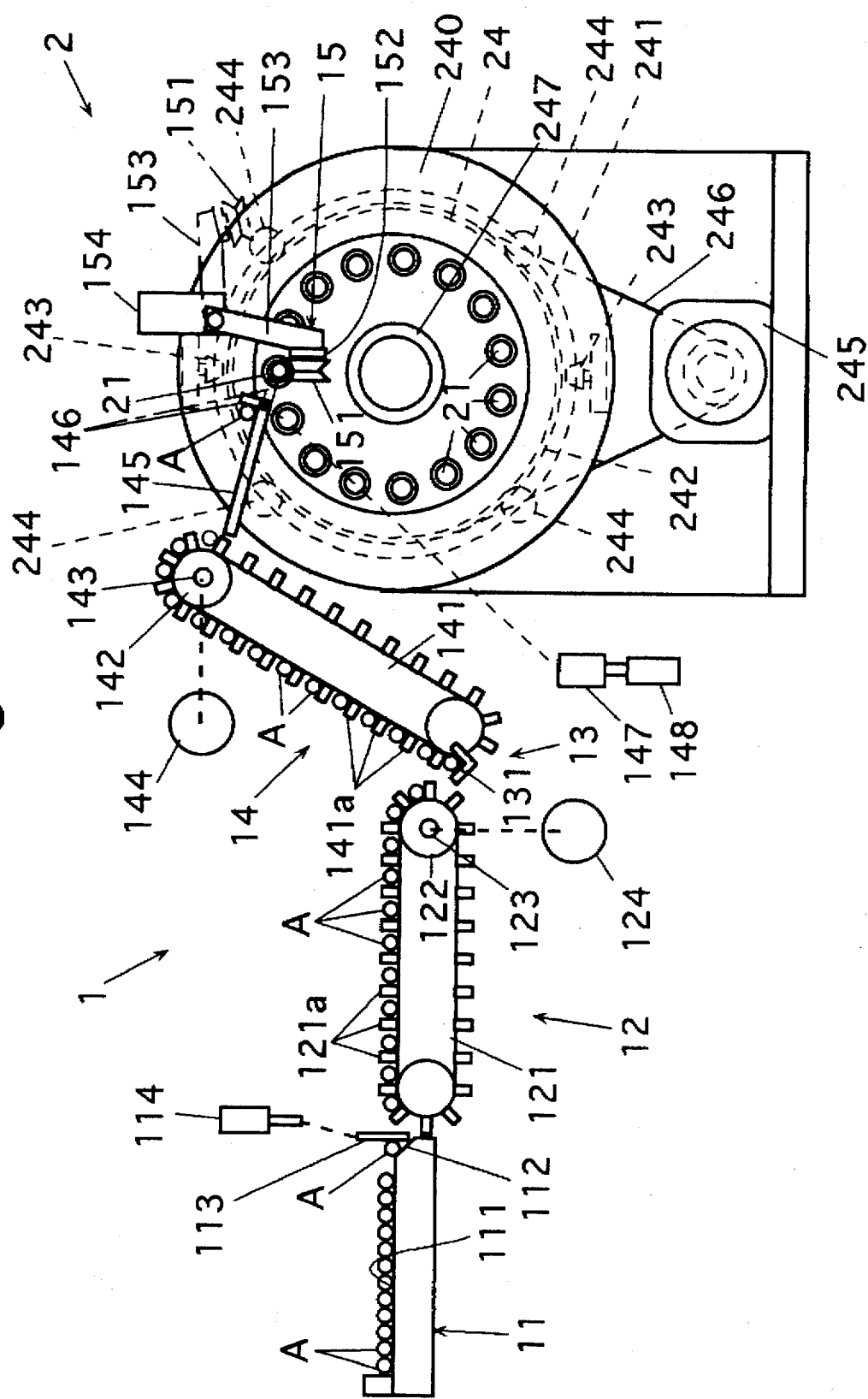
FIG. 2 is a fragmentary rear view of a main reinforcement supplying device and a main reinforcement supporting and rotating device.
Figure 3:
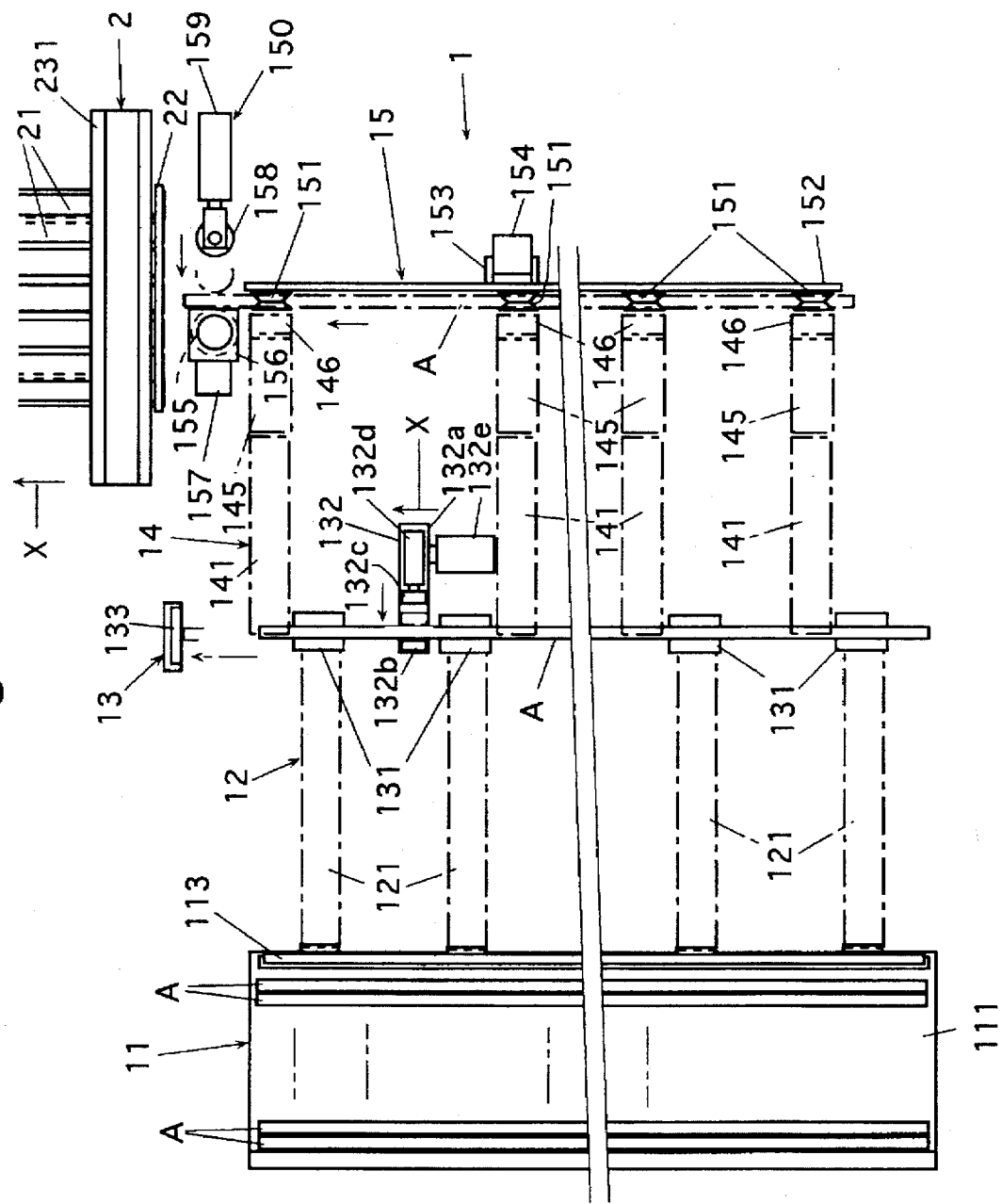
FIG. 3 is a fragmentary schematic plan showing the main reinforcement supplying device and the main reinforcement supporting and rotating device.

The main reinforcement supplying device 1 includes, as shown in FIGS. 1, 2 and 3, a main reinforcement table 11 on which a plurality of main reinforcements A are laid parallel with each other along a direction X of a line extending between the main reinforcement supporting and rotating device 2 and the main reinforcement pull-out device 3, a horizontal transporting conveyor 12 for transporting one by one the main reinforcements A supplied from the table 11, a positioning device 13 for positioning a leading end of the main reinforcement A supplied from the conveyor 12 at a constant position, an inclined transporting conveyor 14 for transporting the positioned main reinforcements A to a rear side of the main reinforcement supporting and rotating device 2, and a feeding device 15 for feeding the main reinforcement A supplied from the conveyor 14 to the device 2. This illustrated embodiment employs a deformed bar SD345 as the main reinforcement A, although the invention is not restricted thereto.

The main reinforcement table 11 includes a flat surface 111, on which the main reinforcements A are laid substantially horizontally, and an inclined surface 112 continuous thereto, and also includes a vertically movable gate 113 located at a lower end of the inclined surface. The gate 113 is vertically driven by a pneumatic cylinder unit 114 as shown in FIG. 2.

The horizontal transporting conveyor 12 is formed of a plurality of parallel spaced horizontal chain conveyors 121, each of which includes a rotary chain provided with main reinforcement transporting claws 121a spaced by a predetermined distance from each other. All drive chain sprockets 122 for the respective chain conveyors 121 are supported by a single drive shaft 123, which is common to all the conveyors 121 and is connected to a drive unit 124 including an electric motor. The positioning device 13 includes a plurality of V-shaped main reinforcement receivers 131 located under discharge ends of the chain conveyors 121 respectively, a main reinforcement feeding unit 132 for feeding, in the direction X described above, the main reinforcement A which is supported by the main reinforcement receivers 131, and a contact member 133 contacting a leading end surface of the main reinforcement A fed thereby. The feeding unit 132 includes a movable table 132a which can reciprocate in the direction X, a main reinforcement supporting claw 132b arranged at an end of the movable table, a pinch claw 132c which is mounted on the movable table 132a for movement toward and away from the claw 132b, a pneumatic cylinder unit 132b mounted on the table 132a for reciprocating the claw 132c, and a pneumatic cylinder unit 132e reciprocating the movable table 132a in the direction X.

The inclined transporting conveyor 14 is formed of a plurality of parallel chain conveyors 141, each of which is provided with a plurality of main reinforcement transporting claws 141a with a predetermined space between each other. Each chain conveyor 141 has a feed end, of which level is substantially equal to the level of the main reinforcement receiver 131 in the positioning device 13, and a discharge end located above the feed end, and thus extends upward as a whole. All drive chain sprockets 142 of the respective conveyors 141 are supported by a single drive shaft 143, which is common to all the conveyors 141 and is connected to a drive unit 144 including an electric motor. Further, each chain conveyor 141 is provided with an inclined guide plate 145 for rolling and falling down the main reinforcement A discharged from its discharge end to a rear side of the main reinforcement supporting and rotating device 2. Each guide plate 145 is provided at its forward end with a rotatable gate plate 146. The gate plate 146 is driven to open and close by a pneumatic cylinder unit 148 via a link unit 147 connected to all the gate plates 146 as shown in FIG. 2. In the closed position shown by solid line in FIG. 2, the gate plate 146 is projected upwardly, and thus does not collide with the main reinforcements A inserted into the main reinforcement supporting and rotating device 2 and rotated thereby.

The main reinforcement feeding device 15 includes a plurality of main reinforcement receiving rollers 151 of which upper surfaces are located at the substantially same level as the gate plates 146 in the inclined transporting conveyor 14, and a main reinforcement feeding unit 150 for feeding and inserting the main reinforcement A supported by the rollers into the main reinforcement supporting and rotating device 2. The respective main reinforcement receiving rollers 151 are rotatably supported by a single common member 152, which is supported by an arm 153 connected to and supported by an arm driving unit 154.

The driving unit 154 can reciprocatively rotate the arm 153 to reciprocate the main reinforcement receiving rollers 151 between a position indicated by solid line in FIGS. 2 and 3 for receiving and feeding the main reinforcement and an escape position indicated by imaginary line in FIG. 2. In the escape position indicated by imaginary line in FIG. 2, the rollers 151 do not collide with the main reinforcements A inserted into and rotated by the main reinforcement supporting and rotating device 2.

Figure 4:
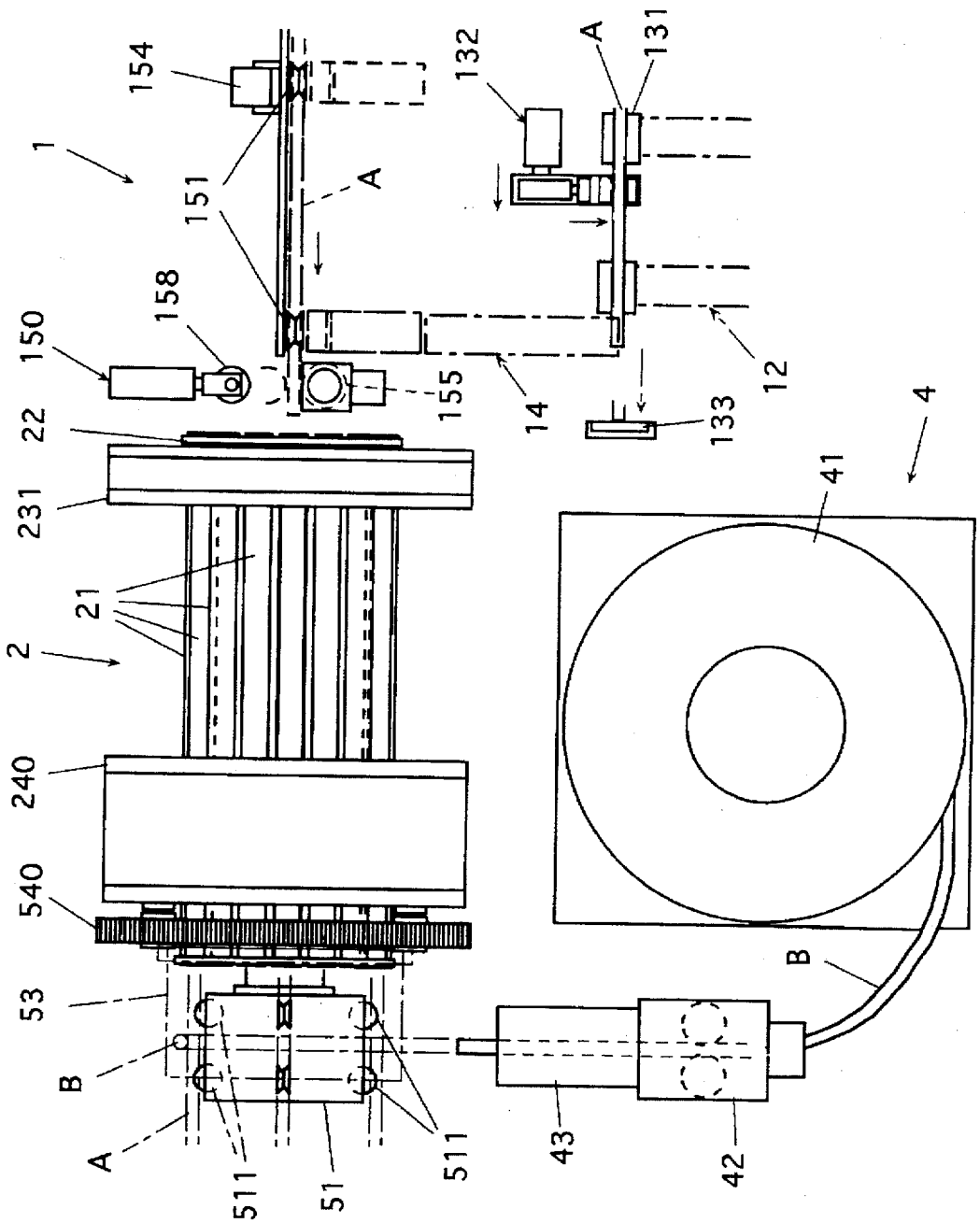
FIG. 4 is a plan showing a portion of the main reinforcement supplying device, the main reinforcement supporting and rotating device and a hoop supplying device.
Figure 5:
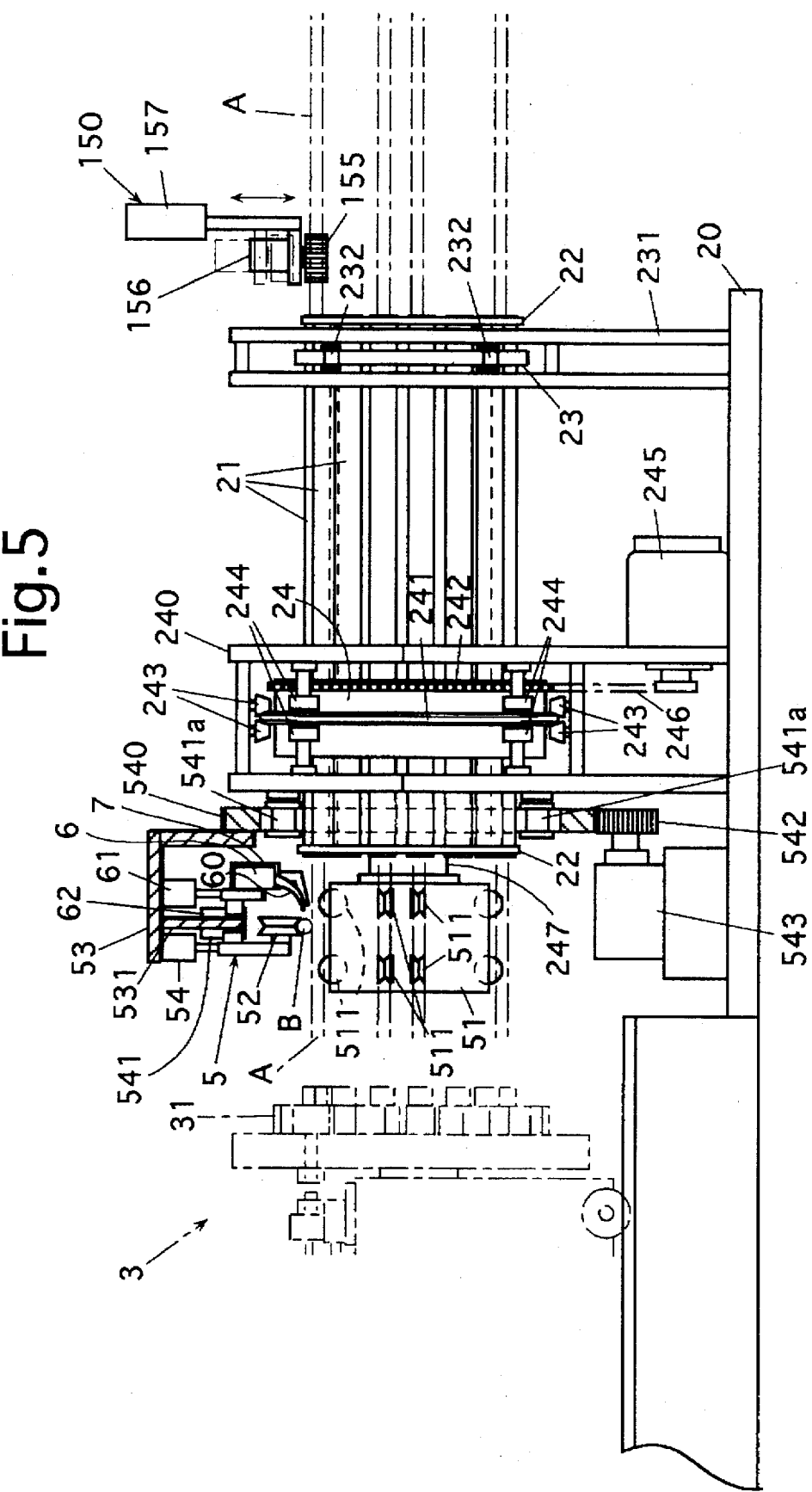
FIG. 5 is a side view showing a structure including the main reinforcement supporting and rotating device, the hoop pushing device, a welding device and a heating device.

The main reinforcement feeding unit 150 includes, as shown in FIGS. 3, 4 and 5, a drive roller 155 vertically movable with respect to a side surface of the end of the main reinforcement A, which is positioned by the positioning device 13, fed by the inclined transporting conveyor 14 and supported by the main reinforcement receiving rollers 151, a drive unit 156 including an electric motor for rotating the roller 155, an pneumatic cylinder unit 157 for vertically driving the roller 155 and the drive unit 156, a pinch roller 158 which can contact with and move away from the other side surface of the end of the main reinforcement A, and a pneumatic cylinder unit 159 for reciprocating the roller 158. At the raised position of the drive roller 155 and the retreated position of the pinch roller 158, they do not collide with the main reinforcements A supported and rotated by the main reinforcement supporting and rotating device 2.

According to the main reinforcement supplying device 1 described above, a large number of main reinforcements A laid on the main reinforcement table 11 are manually fed one by one to the inclined surface 112 of the main reinforcement table, and are stopped by the gate 113 located at the lowered position. When the main reinforcement transporting claws 121a on chain conveyors 121 in the horizontal conveyor 12 reach the position for receiving the main reinforcement A, the gate 113 is opened, so that the main reinforcement A falls onto the claws 121a. Then, the gate 113 is closed. The main reinforcement A received by the transporting conveyor 12 in this manner is fed by driving the conveyor, and is discharged from its discharge end onto the V-shaped main reinforcement receivers 131 in the positioning device 13.

The main reinforcement A received on the main reinforcement receivers 131 is pinched between the main reinforcement supporting claw 132b and the pinch claw 132c which is forwardly driven by the pneumatic cylinder unit 132d of the main reinforcement feeding unit 132 in the positioning device 13. Subsequently, the pneumatic cylinder unit 132e is driven to advance the movable table 132a together with the main reinforcement A, so that the end of the main reinforcement A is brought into contact with and positioned by the contact member 133. Then, the pinch claw 132c retreats, and the movable table 132a also retreats for moving the next main reinforcement. Then, the main reinforcement A is scooped and transported upward by the transporting claws 141a of the chain conveyors 141 in the transporting conveyor 14. The main reinforcement A which is transported to the discharge ends of the chain conveyors 141 falls onto the guide plates 145 and is stopped by the gate plates 146 at the ends of the guide plates. In accordance with the timing for feeding and inserting the main reinforcement A into the main reinforcement supporting and rotating device 2, the main reinforcement receiving rollers 151 in the main reinforcement feeding device 15 are lowered to the position for receiving and feeding the main reinforcement, and the gate plates 146 are opened so that the main reinforcement A falls onto the main reinforcement receiving rollers 151. Then, the gate plates 146 are closed for the next main reinforcement.

The main reinforcement A which is positioned and disposed on the main reinforcement receiving rollers 151 as described above is fed and inserted into one of main reinforcement insert pipes 21 (see FIG. 2) in the main reinforcement supporting and rotating device 2 in such a manner that the drive roller 155 at the main reinforcement feeding unit 150 in the feeding device 15 lowers onto the side surface of the end of the main reinforcement, the pinch roller 158 is pushed against the other side surface of the end of the main reinforcement by the pneumatic cylinder unit 159, and the drive roller 155 is driven by the drive unit 156. Thereafter, the main reinforcement receiving rollers 151 are pivoted upwardly to the escape position, the drive roller 155 rises, and the pinch roller 158 retreats.

(2) Main Reinforcement Supporting and Rotating Device 2

The device 2 is fragmentarily shown in FIG. 2 and is entirely shown in FIGS. 4 and 5. The device 2 include a plurality of parallel pipes 21 for supporting the main reinforcements, which have registered ends, are equally and angularly spaced to each other and are arranged to form a cylinder of a predetermined diameter as a whole. Opposite ends of each pipe 21 are inserted into and fixed to circular plates 22. At the end of the group of pipes 21 near the main reinforcement supplying device 1, there is arranged an annular ring member 23 fitted and fixed around the end. A cylindrical drum 24 is fitted and fixed around a portion of the pipe group near the other end. The ring member 23 is rotatably held at its outer peripheral surface by a plurality of angularly spaced supporting rollers 232, which are rotatably supported by a frame 231 mounted on a base 20. The cylindrical drum 24 is provided at a central portion of its outer peripheral surface with a ring-like projection 241, and is also provided at its one end with a chain sprocket ring 242 fitted and fixed around the outer peripheral surface of the drum. The ring-like projection 241 is rotatably pinched on its opposite sides by a plurality of pairs of supporting rollers 243 rotatably supported by a frame 240 mounted on the base 20, so that its movement in the lengthwise direction of the pipe 21 is prevented. The frame 240 rotatably supports a plurality of pairs of rollers 244. Each pair of the rollers 244 are rotatably in contact with outer peripheral surface of the drum 24 at the opposite sides of the ring-like projection 241, so that the drum 24 is rotatably held and supported on its outer peripheral surface by the pairs of rollers 244. An electric motor 245 is mounted on the base 20, and is connected to the drum 24 via a chain transmission device 246 including the chain sprocket ring 242.

A cylindrical core member 247 is concentrically inserted into the group of the cylindrically arranged pipes 21, and is fixed to the circular plates 22 and 22 at the opposite ends of the pipe group.

FIG. 2 showing the main reinforcement supporting and rotating device 2 does not show the frame 231 mounted on the base 20 and the members such as rollers 232 supported thereby in FIG. 5. According to the main reinforcement supporting and rotating device 2 described above, the motor 245 rotates the cylindrical drum 24 in the predetermined direction (i.e., counterclockwise direction in FIG. 2.) to rotate the group of pipes 21 in the same direction, so that the pipes 21 are located one by one at the position confronting the main reinforcement A supported by the main reinforcement feeding device 15 in the main reinforcement supplying device 1, and, at this position, the feeding device 15 inserts the main reinforcement A into the pipe. By intermittently repeating this operation, the main reinforcements A are inserted into the predetermined number of pipes 21 at the predetermined positions. The main reinforcements A inserted into the pipes 21 have ends protruded toward the side remote from the device 2, and the protruded ends are held by the chucks 31 of the main reinforcement pull-out device 3 located at this position, which will be described later.

At the vicinity of the end of the device 2 remote from the main reinforcement supplying device 1, there are arranged the hoop pushing device 5, the welding device 6 and the heating device 7.

(3) Hoop Pushing Device 5

Figure 6:
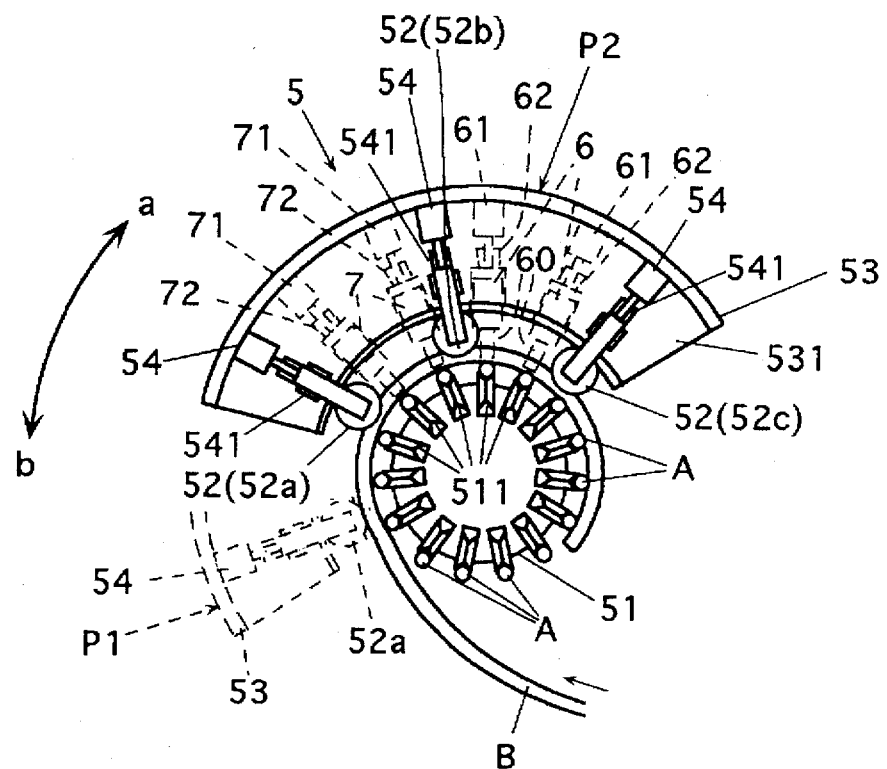
FIG. 6 is an elevation showing a structure including the hoop pushing device, the welding device and the heating device.

As shown in FIGS. 5 and 6, the device 5 includes a main reinforcement supporting member 51 removably attached to the end of the cylindrical core member 247 of the device 2, and three hoop pushing rollers 52 which are arranged around the member 51 and are angularly and equally spaced from each other on a circle concentric with a rotation path of the member 51.

In this embodiment, the main reinforcement supporting member 51 is a cylindrical block. Around this block, roller pairs each including two rollers 511, which are spaced along the moving direction of the main reinforcement A and are rotatably supported by the block, are concentrically arranged and are angularly spaced from each other by an angle equal to that between the pipes 21. The main reinforcement A protruded from the device 2 and held by the chuck 31 of the device 3 is in contact with and supported by the paired rollers 511.

The main reinforcement supporting member 51 and the roller pairs 511 also serve as electrodes of the welding devices 6 which will be described later.

Each of the three hoop pushing rollers 52 is supported by a pneumatic cylinder unit 54 on an arc-shaped frame 53 disposed outside the main reinforcement supporting member 51 and is movable toward and away from the member 51. When moving, the roller 52 is guided by a guide 541 on a plate 531 extending downward from a center of the frame 53 without being swung. The arc-shaped frame 53 is fixed to one side surface of a ring gear 540 fitted around the group of pipes 21 in the device 2 (see also FIG. 4). A plurality of supporting rollers 541a, which are rotatably supported on one side of the frame 240 mounted on the base 20, are rotatably in contact with the inner peripheral surface of the ring gear 540, so that a plurality of the supporting rollers 541a support the ring gear 540 rotatably around the outer periphery of the group of pipes 21.

The ring gear 540 is meshed with a pinion 542 which can be forwardly and reversely rotated by a drive unit 543 including an electric motor mounted on the base 20. According to this hoop pushing device 5, the frame 53 is initially located at a predetermined position P1 represented by dotted line in FIG. 6. At this position, a leading end of the supplied hoop B is received by the hoop pushing roller 52a at the left end viewed from the side of the main reinforcement pull-out device 3, so that the leading end of the hoop B is located over the adjacent two main reinforcements A and is pushed against the main reinforcements A by the roller. When the frame is located at the predetermined position P1, the middle and right rollers 52b and 52c are located at the same positions as the rollers 52a and 52b represented by solid line in FIG. 6, respectively. The hoop B is continuously and appropriately (i.e., sufficiently but not excessively) supplied from the hoop supplying device 4 (see FIGS. 1 and 4) which will be described later.

Initially, the leading end of the supplied hoop B is held and pushed downward against the main reinforcements A by the roller 52a which is located at the position P1 and moved toward the group of the main reinforcements A by the pneumatic cylinder unit 54. While maintaining this state, the frame 53 is rotated by the drive unit 543 in the same direction and at the same speed as the group of main reinforcements A rotated in the direction a (see FIG. 6) by the main reinforcement supporting and rotating device 2, so that the appropriately supplied hoop B is wound around the group of the main reinforcements A. When the arc-shaped frame 53 reaches the position P2 indicated by solid line in FIG. 6, the left roller 52a reaches the position indicated by solid line in FIG. 6, and then the frame 53 is reversely rotated in the direction of an arrow b in FIG. 6 by reverse operation of the drive unit 543, so that roller 52a returns to the initial position P1 while maintaining the state that it pushes the hoop B against the main reinforcements A. Thereby, the leading end of the hoop B is released from the roller 52a, and simultaneously, is located under the pushing roller 52b. At this time, the central roller 52b is moved toward the group of main reinforcements A by the operation of the pneumatic cylinder unit 54 for the roller 52b, so that the roller 52b pushes the leading end of the hoop against the main reinforcements A. Thereafter, the frame 53 is rotated again in the direction of the arrow a at the same speed as the group of the main reinforcements A, and the rollers 52a and 52b move to the position indicated by solid line in FIG. 6. Then, the frame 53 is rotated again to return to the initial position P1. In this state, the leading end of the hoop B is located under the right pushing roller 52c. The roller 52c is moved toward the group of the main reinforcements A by the pneumatic cylinder unit 54 for the roller 52c, so that the roller pushes downward the leading end of the hoop against the main reinforcements A. After all the rollers 52 are located at the position for pushing the hoop B against the main reinforcements A, this state is maintained until the end of manufacturing of the reinforcing bar cage. Finally, all the rollers 52 are retreated to move away from the reinforcing bar cage by the pneumatic cylinder units 54. The frame 53 is reciprocatively rotated between the positions P1 and P2 indicated by dotted line and solid line in FIG. 6 in accordance with the timing for welding and heating the crossed portions of the hoop B and the main reinforcements A as will be described later. When the frame 53 moves from the position P1 to the position P2, it rotates at the same speed as the group of the main reinforcements A. When the frame 53 returns from the position P2 to the position P1, it returns quickly.

(4) Hoop Supplying Device 4

The device 4 is disposed near the main reinforcement supporting and rotating device 2 as shown in FIGS. 1 and 4, and includes a reel device 41 holding the continuous hoop B in the wound fashion, a feeding roller device 42 for pulling out and feeding the hoop B from the device 41, and a reforming device 43 for straightening and feeding the hoop. The device 4 continuously supplies the hoop B at an appropriate feed rate. Although not restricted, the hoop B is a deformed bar SD295 in this embodiment.

(5) Welding Device 6 and Heating Device 7

The welding devices 6 are shown in FIGS. 5 and 6. The device 6 in this embodiment is a semi-automatic arc welding device performing spot welding. The welding devices 6 are two in number, and are disposed at one side with respect to the vertical plate 531 of the arc-shaped frame 53 in the hoop pushing device 5 and remote from the hoop pushing rollers 52. Each welding device 6 is supported by a pneumatic cylinder unit 61 provided at the frame 53 for movement toward and away from the main reinforcement supporting member 51, and is guided by a guide 62 on the vertical plate 531 to move without swinging. When viewed from the side of the main reinforcement pull-out device 3, the two welding devices 6 are located between the hoop pushing rollers 52b and 52c, and more specifically at positions, which trisect an angular space between the rollers 52b and 52c, on a circle concentric with a rotation path of the main reinforcement supporting member 51. When each welding device 6 is moved toward the main reinforcement supporting member 51 by the corresponding pneumatic cylinder unit 61, a torch 60 of the welding device 6 moves toward the crossed portion of the main reinforcement A and the hoop B pushed against the main reinforcement A by the rollers 52b and 52c.

The heating devices 7 are also shown in FIGS. 5 and 6. The heating devices 7 are gas burners and are two in number in this embodiment. Each heating device 7 is disposed at the same side as the welding device 6 with respect to the vertical plate 531, and is supported by a pneumatic cylinder unit 71 for movement toward and away from the main reinforcement supporting member 51. For this movement, the device 7 is guided by a guide 72 on the vertical plate 531 of the frame 53 to move without swinging. When viewed from the side of the main reinforcement pull-out device 3, the two heating devices 7 are located between the hoop pushing rollers 52a and 52b, and more specifically at positions, which trisect an angular space between the rollers 52a and 52b, on a circle concentric with a rotation path of the main reinforcement supporting member 51. Similarly to the welding device 6, when each heating device 7 is moved toward the main reinforcement supporting member 51, it reaches the crossed portions of the main reinforcement A and the hoop B pushed against the main reinforcement by the rollers 52a and 52b.

According to the welding devices 6 and the heating devices 7 described above, the heating devices 7 approach the crossed portions of the main reinforcements A and the hoop B, which is pushed against the main reinforcements A by the hoop pushing rollers 52a and 52b, and heat the crossed portions. This heating is performed while the arc-shaped frame 53 is being rotated at the same speed and in the same direction as those of the group of the main reinforcements A. This heating by the heating devices 7 is performed for the purpose of preventing hardening of the portions of the reinforcing bar cage and particularly the portions of the main reinforcements A, which will be welded by the welding devices 6 at the later step, and thereby preventing reduction of the extensibility, so that an intended strength of the reinforcing bar cage may be achieved. When the two crossed portions of the main reinforcements A and the hoop B thus heated by the heating devices 7 are located between the rollers 52b and 52c by the operation of the hoop pushing device 5 already described, the torch of each welding device 6 approaches and spot-welds the crossed portions. This spot-welding is also performed while the arc-shaped frame 53 is rotating at the same speed and in the same direction as those of the group of the main reinforcements A. While the spot welding is being performed, the crossed portions to be subsequently welded are heated by the heating devices 7.

The group of the main reinforcements A, of which ends protrude from the main reinforcement supporting and rotating device 2 and are held by the chucks 31 of the main reinforcement pull-out device 3, is slowly rotated in the direction of arrow a shown in FIG. 6 owing to the operation of the motor 245 in the device 2 and the rotation of the chucks 31, which will be described later, of the main reinforcement pull-out device 3, and is pulled out from the device 2 by the rearward movement of the device 3. The hoop supplying device 4 continuously supplies the hoop B to the group of the main reinforcements A, and the hoop pushing device 5 winds the hoop around the grouped main reinforcements A. Therefore, the hoop B is spirally wound around the grouped main reinforcements A in accordance with rotation and longitudinal movement of the grouped main reinforcements A. During this spiral winding, the crossed portions of the hoop B and the main reinforcements A are heated two by two by the heating device 7, and subsequently the welding devices 6 perform the spot welding on the two heated portions. By successively repeating the heating and welding, all the crossed portions of the hoop B and the main reinforcements A are welded.

(6) Main Reinforcement Pull-Out Device 3

Figure 7:
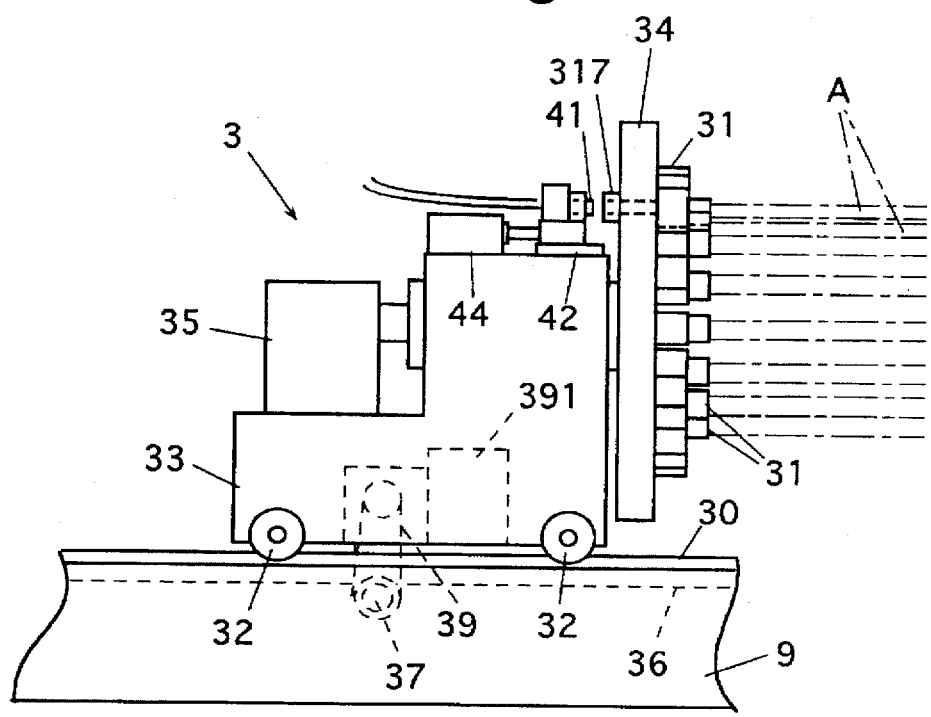
FIG. 7 is a side view of a main reinforcement pull-out device.
Figure 8:
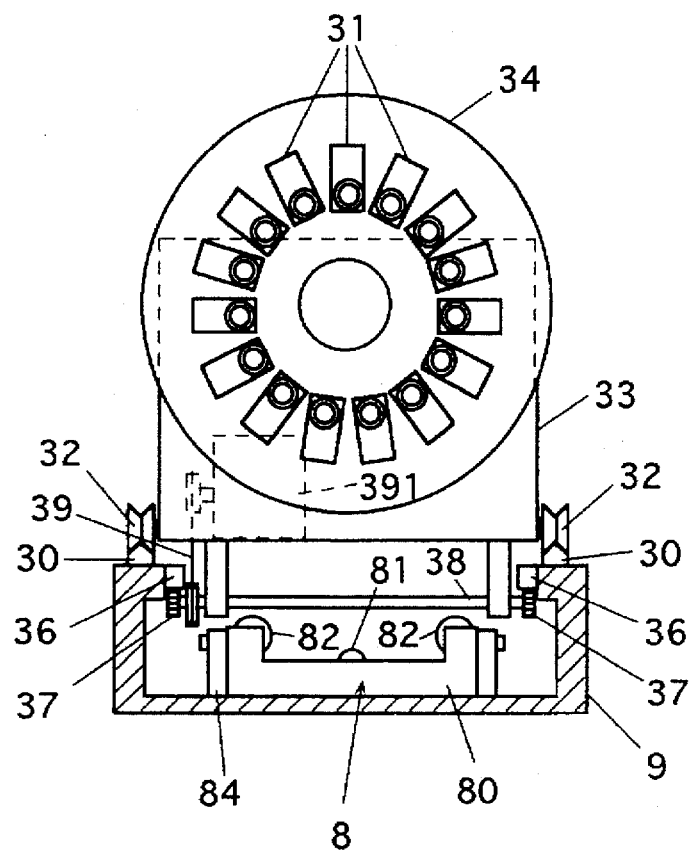
FIG. 8 is a view of the main reinforcement pull-out device and an auxiliary supporting device viewed from the side of the main reinforcement supporting and rotating device.

As shown in FIGS. 7 and 8, the device 3 includes a frame 33 provided with wheels 32 which run on a pair of parallel rails 30 arranged on the base frame 9 and extending in the same direction as the cylindrically arranged main reinforcements A. The frame 33 rotatably supports a circular plate 34. The chucks 31 for pinching and holding the main reinforcements, which are equal in number to the pipes 21 in the device 2, are fixed to one surface of the plate 34 faced toward the main reinforcement supporting and rotating device 2. The chucks 31 are disposed on the same circle in diameter as that on which the pipes 21 in the device 2 are disposed, and are angularly and equally spaced from each other. The circular plate 34 is driven to rotate by a drive unit 35 including an electrical motor mounted on the frame 33.

Figure 9:
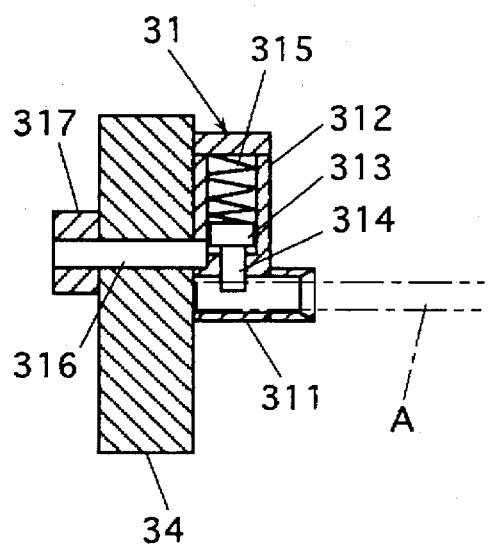
FIG. 9 is a cross section of a chuck for holding the main reinforcement.

As shown in FIG. 9, each chuck 31 includes a cylindrical member 311 receiving the end of the main reinforcement A and a cylinder 312 connected thereto. A piston 313 is disposed in the cylinder 312, and a main reinforcement pushing rod 314 is projected from the piston. A compressible coil spring 315 is fitted into the cylinder 312 for always pushing the piston 313 toward the cylindrical member 311. The cylindrical member 311 is provided with an aperture through which the rod 314 extends. The main reinforcement A is inserted into the cylindrical member 311, and the rod 314 is projected into the cylindrical member 311, so that the main reinforcement A is pinched between the rod 314 and the inner surface of the cylindrical member 311, and thus is held by the chuck 31. The cylinder 312 is communicated with an air supply pipe 316, which extends through the circular plate 34 and protrudes toward the frame 33. A nozzle connection 317 is arranged at the projected portion of the pipe 316. Although FIG. 7 shows only one air supply pipe 316 and only one nozzle connection 317, these are provided correspondingly to each chuck 31. At one position of the frame 33, there is arranged a nozzle 41 connected to a compressed air source and mounted on a movable table 42, which is arranged on the frame 33 and can move toward and away from the circular plate 34. The movable table 42 is reciprocatively driven by a pneumatic cylinder unit 44. The nozzle 41 is arranged such that it may be opposed to the nozzle connection 317 of the chuck 31 at the position where it holds the main reinforcement A inserted into the pipe 21 of the main reinforcement supporting and rotating device 2 by the main reinforcement supplying device 1 and projected from the other side. When the nozzle connection 317 is opposed to the nozzle 41, the pneumatic cylinder unit 44 advances the movable table 42 to connect the nozzle 41 with the connection 317, so that compressed air is supplied into the cylinder 312. Consequently, the piston 313 moves rearward from the cylindrical member 311 against the elastic force of the spring 315, so that the rod 314 also moves rearward from the cylindrical member 311. In this state, the main reinforcement A is inserted into the cylindrical member 311, and the nozzle 41 moves rearward from the connection 317, so that the spring 315 moves the piston 313 toward the cylindrical member 311, and the rod 314 holds the main reinforcement A between the inner wall of the cylindrical member 311 and itself.

The base frame 9 is hollow, and has an opening at its upper end. Racks 36 are fixed to the inner side surfaces of the upper opening. Each rack 36 extends in the same direction as the rail 30 over the substantially entire length, and a pinion 37 is meshed with each rack. Both the pinions are supported by a common shaft 38, which is rotatably supported by the frame 33. The shaft 38 can be bidirectionally rotated by a drive unit 391 including an electric motor in the frame 33 via a chain transmission 39.

The main reinforcement pull-out device 3 described above is initially positioned near the main reinforcement supporting and rotating device 2 (see FIG. 5), and successively holds the ends of the main reinforcements A successively protruded from the device 2 with the respective chucks 31 in accordance with intermittent rotation of the circular plate 34 by the drive unit 35. After ends of all the main reinforcements A are held by the corresponding chucks 31, the drive unit 35 rotates the circular plate 34 at the same speed and in the same direction as those of the rotation of the main reinforcements A by the device 2, and the drive unit 391 rotates the pinions 37 to retreat slowly the entire device 3 along the base frame 9. In accordance with the above operation, the spiral winding and welding of the hoop B described above are performed.

(7) Auxiliary Supporting Device 8

Figure 10:
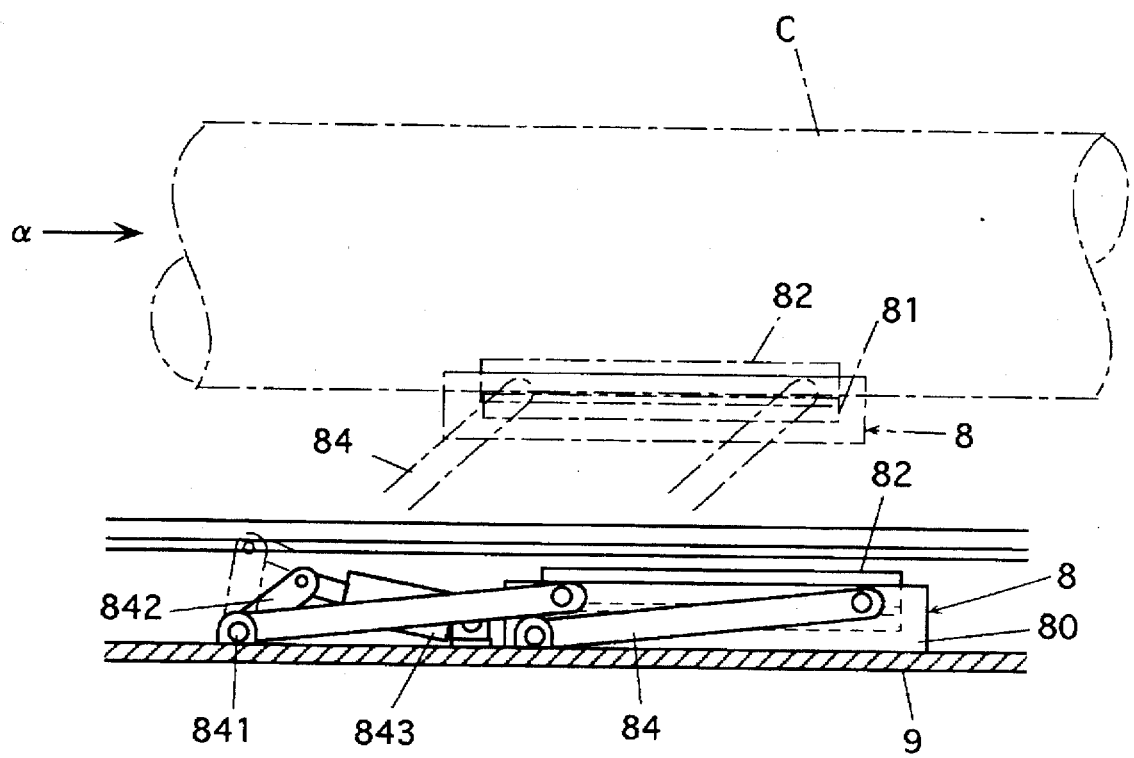
FIG. 10 is a side view of the auxiliary supporting device.
Figure 11:
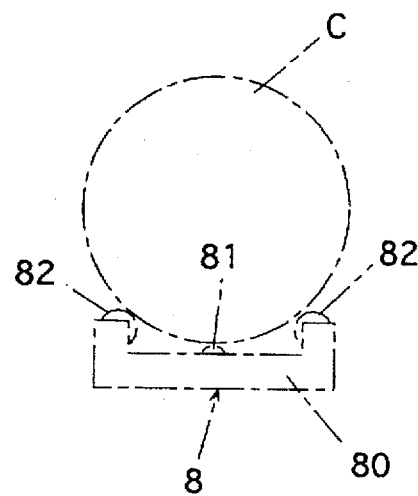
FIG. 11 shows a cage supported by the auxiliary supporting device taken in a direction of an arrow α in FIG. 10.

When the main reinforcement pull-out device 3 moves rearward to some extent, the reinforcing bar cage C (see FIG. 1) supported between the devices 2 and 3 may be deformed downward. In order to prevent this deformation, the auxiliary supporting devices 8 are arranged in the base frame 9 with a predetermined space between each other (see FIG. 1). Each auxiliary supporting device 8 is provided with a roller supporting frame 80 as shown in FIGS. 8, 10 and 11. The frame 80 is provided at its central portion with a rotatable roller 81 extending in the lengthwise direction of the main reinforcement A, and is also provided with rollers 82 which extend in the same direction and arranged at the left and right sides of the roller 81. The frame 80 is connected to a parallel link mechanism 84 including a link, of which rotary shaft 841 is connected to a lever 842 reciprocatively driven by a pneumatic cylinder unit 843. Thus, the pneumatic cylinder unit 843 drives the parallel link mechanism 84 to raise the frame 80 from a position inside the base frame 9 to a position close to the lower surface of the reinforcing bar cage C, so that the roller 81 and the left and right rollers 82 are brought into contact with the lower surface of the reinforcing bar cage C to support the same. When it does not support the cage C, the frame 80 lowers into the base frame 9 to allow passage of the device 3. In this embodiment, mutual positions in the vertical and lateral directions of the rollers 81 and 82 as well as a distance between the rollers 82 are constant in this embodiment. However, such a structure may be employed that allows adjustment of these positions and distance in accordance with the sizes of the reinforcing bar cage C.

According to the apparatus for manufacturing the reinforcing bar cage described above, the reinforcing bar cage is manufactured as follows.

The main reinforcements A supplied one by one by the main reinforcement supplying device 1 are disposed and supported by the main reinforcement supporting and rotating device 2 in a cylindrical form, and the ends of the grouped main reinforcements A projected from the device 2 are held by the main reinforcement pull-out device 3. The main reinforcement supporting and rotating device 2 and the main reinforcement pull-out device 3 rotate the group of the main reinforcements A in the predetermined direction, during which the device 3 moves rearward to pull out the main reinforcements A from the device 2. During the above operation, the hoop B is appropriately supplied from the hoop supplying device 4 to the grouped main reinforcements A, and the supplied hoop B is pushed against the grouped main reinforcements A by the hoop pushing device 5 and thus is spirally wound around the grouped main reinforcements A. The heating devices 7 heat the crossed portions of the main reinforcements A and the hoop B spirally wound around the grouped main reinforcements A, and the welding devices 6 spot-weld the crossed portions immediately after the heating. In this manner, the reinforcing bar cage C is manufactured. Although the deformed bar SD345, which is generally considered not to be suitable to the welding, is used as the main reinforcement A, the manufactured reinforcing bar cage can have the intended strength.

The apparatus for manufacturing the reinforcing bar cage according to the invention is not restricted to the structure described above, and may employ various structures. For example, the number of the pipes 21 in the main reinforcement supporting and rotating device 2 is not restricted to the value in the embodiment already described, and may be larger or smaller than that in the embodiment. The inner diameter of the pipe 21 can be determined appropriately in accordance with the diameter of the main reinforcement. In accordance with the diameter of the reinforcing bar cage C to be manufactured, the pipes 21 may be arranged on two or more concentric circles. In this case, the main reinforcement feeding device 15 in the supplying device 1 may be structured to allow, e.g., vertical movement so as to enable appropriate arrangement thereof in accordance with the diameter of each circle defined by the pipes 21. In the device 2, the main reinforcement supporting member 51 having an appropriate diameter may be exchanged in accordance with the diameter of the reinforcing bar cage. Also, the main reinforcement pull-out device 3 may be structured to allow change of the positions of the chucks 31 for allowing the change of the diameter of the circle defined by the chucks 31. The chucks 31 may be arranged on two or more concentric circles.

The numbers and positions of the hoop pushing rollers 52 in the device 5, the heating devices 7 and the welding devices 6 are not restricted to those in the embodiment described above. The positions of the welding devices 6 and the heating devices 7 may be exchanged to perform the heating by the heating devices 7 after the welding by the welding devices 6.

Since the reinforcing bar cage C described above can be manufactured automatically, labor-saving operation and efficient and safe manufacturing can be achieved. Since the manufactured reinforcing bar cage C has good quality and accuracy as well as a high strength preventing destruction and deformation which may be caused by severe handling such as transportation and hanging. Since the crossed portions of the main reinforcements A and the hoop B are heated in connection with the welding thereof, such a disadvantage can be prevented that the spot-welded portions are naturally and rapidly cooled after the welding, and thus the required strength of the reinforcing bar cage cannot be achieved due to hardening and reduction of the extensibility.

Although a conventional ring such as a ring of steel belt welded to the main reinforcements for holding them is not arranged inside the reinforcing bar cage C, the reinforcing bar cage C has a good shape-maintaining property, a tremie pipe can be sunk smoothly, and underwater-concreting can be performed with good filling property.

Heating and welding of the crossed portions can be adjusted to achieve the following effect. Thus, the reinforcing bar cage C and particularly the main reinforcements A have values of the strength at the yield point, tensile strength and extensibility required, e.g., in the metal material tensile testing method (JIS Z 2241-1980), a rate of possible breakage at the welded portions of the main reinforcements A is small (e.g., not higher than 10%), and the strength at the yield point and the tensile strength are within a range defined by JIS even if breakage occurs.

As described above, the invention can provide the method of manufacturing the reinforcing bar cage, which allows simple and easy manufacturing of the reinforcing bar cage used in a cast-in-place piling method of constructing a reinforced concrete pile for a structure as compared with a conventional case in which hoops are bound to main reinforcements with binding wires, and can achieve an intended cage strength without substantially increasing a cost of material used for the cage.

Further, the invention can provide the method of manufacturing the reinforcing bar cage and the apparatus for the same, which allow simple and easy manufacturing of the reinforcing bar cage used in a cast-in-place piling method of constructing a reinforced concrete pile for a structure as compared with a conventional case in which hoops are bound to main reinforcements with binding wires, can achieve an intended cage strength without substantially increasing a cost of material used for the cage, and allow labor-saving and efficient manufacturing with safety and high accuracy.

What is claimed is:

1. A method of manufacturing a reinforcing bar cage comprising the steps of arranging longitudinally extending main reinforcements in a cylindrical form, arranging and connecting a hoop to said cylindrically arranged main reinforcements by welding crossed portions of said main reinforcements and said hoop, and additionally heating said crossed portions by gas combustion heating to prevent hardening and reduction of extensibility of said welded crossed portions.

2. A method of manufacturing a reinforcing bar cage according to claim 1, wherein said welding between said reinforcements and said hoop is performed at the crossed portions of each main reinforcement and each hoop.

3. A method of manufacturing a reinforcing bar cage according to claim 1, wherein said welding of said crossed portions of said main reinforcements and said hoop is performed by spot-welding.

4. A method of manufacturing a reinforcing bar cage according to claim 1, wherein said additional heating of said crossed portions of said main reinforcements and said hoop is performed immediately after said welding.

5. A method of manufacturing a reinforcing bar cage according to claim 1, wherein said arrangement of said hoop with respect to said main reinforcements is performed by spirally and continuously winding the hoop around the main reinforcements along a longitudinal extending direction of the main reinforcements.

6. A method of manufacturing a reinforcing bar cage comprising the steps of arranging longitudinally extending main reinforcements in a cylindrical form; moving a group of said main reinforcements in a longitudinal direction of the main reinforcements while rotating said group in a predetermined direction, and supplying a continuous hoop to said group of said moving and rotating main reinforcements for spirally winding said hoop around said group; successively welding crossed portions of said hoop and said main reinforcements with a welding device which confronts said group of said main reinforcements, which welding device can rotate a predetermined angle from a predetermined position in the same direction as said group of said main reinforcements and can return to said predetermined position; and additionally heating said crossed portions by a gas combustion heating device which is disposed near said welding device and can reciprocatively rotate in said same direction as said welding device.

7. A method of manufacturing a reinforcing bar cage according to claim 6, wherein said welding between said reinforcements and said hoop is performed at the crossed portions of each main reinforcement and each hoop.

8. A method of manufacturing a reinforcing bar cage according to claim 6, wherein said welding of said crossed portions of said main reinforcements and said hoop is performed by spot-welding.

9. A method of manufacturing a reinforcing bar cage according to claim 6, wherein said additional heating of said crossed portions of said main reinforcements and said hoop is performed immediately after said welding.

10. An apparatus for manufacturing a reinforcing bar cage comprising:

a device for supplying longitudinally extending main reinforcements;

a main reinforcement supporting and rotating device for cylindrically arranging and supporting said main reinforcements supplied from said main reinforcement supplying device, and rotating a group of said supported main reinforcements while allowing movement of said group of said main reinforcements in a longitudinal direction of said main reinforcements;

a main reinforcement pull-out device for pulling out said group of said main reinforcements supported by said main reinforcement supporting and rotating device from the main reinforcement supporting and rotating device by moving said main reinforcement group in said longitudinal direction while holding an end of said main reinforcement group and rotating the same together with said main reinforcement supporting and rotating device;

a hoop supplying device for supplying a continuous hoop to said main reinforcement group which is supported by said main reinforcement supporting and rotating device and said main reinforcement pull-out device and is being rotated and pulled out from said main reinforcement supporting and rotating device;

a hoop pushing device which confronts said main reinforcement group supported by said main reinforcement supporting and rotating device, can rotate a predetermined angle in the same direction as said main reinforcement group from a predetermined position, which pushing device can return to said predetermined position, and is operable to push said hoop supplied from said hoop supplying device against an outer surface of said main reinforcement group;

a welding device which confronts said main reinforcement group supported by said main reinforcement supporting and rotating device, can rotate a predetermined angle in the same direction as said main reinforcement group from a predetermined position, which welding device can return to said predetermined position, and is operable to weld crossed portions of said main reinforcements and said hoop pushed against said main reinforcement group by said hoop pushing device; and a gas combustion additional heating device which is disposed adjacent said welding device, which additional heating device can reciprocate in the same direction as said welding device, and is operable to additionally heat said crossed portions of said hoop and said main reinforcements in connection with said welding.

11. An apparatus for manufacturing a reinforcing bar cage according to claim 10, wherein said main reinforcement supplying device includes a main reinforcement table on which a plurality of said main reinforcements are disposed parallel to a line extending from said main reinforcement supporting and rotating device toward said main reinforcement pull-out device; a first transporting device for transporting one by one said main reinforcements supplied from said main reinforcement table; a device for positioning a leading end of said main reinforcement supplied from said first transporting device at a constant position; a second transporting device for transporting said positioned main reinforcement to a rear side of said main reinforcement supporting and rotating device; and a device for feeding said main reinforcement supplied from said second transporting device to said main reinforcement supporting and rotating device.

12. An apparatus for manufacturing a reinforcing bar cage according to claim 10, wherein said main reinforcement supporting and rotating device includes a rotary member having a plurality of main reinforcement insert apertures for cylindrically arranging and supporting said main reinforcements, and a drive device for rotating said rotary member.

13. An apparatus for manufacturing a reinforcing bar cage according to claim 12, wherein said hoop pushing device, said welding device and said heating device are supported by a supporting member which is disposed near said rotary member having said main reinforcement insert apertures in said main reinforcement supporting and rotating device and can be rotated concentrically with said rotary member, and said supporting member is reciprocatively rotated by a drive device.

14. An apparatus for manufacturing a reinforcing bar cage according to claim 12, wherein said hoop pushing device includes an inner supporting member supported by said rotary member having said main reinforcement insert apertures in said main reinforcement supporting and rotating device and supporting an inner side of said main reinforcement group held by said rotary member.

15. An apparatus for manufacturing a reinforcing bar cage according to claim 14, wherein said welding device includes an electrode which is to be in contact with said reinforcing bars, and said inner supporting member functions as said electrode of said welding device.

16. An apparatus for manufacturing a reinforcing bar cage according to claim 10, wherein said main reinforcement pull-out device includes a rotary member provided with circularly arranged chucks for disengagably holding said main reinforcements, a drive device for said rotary member, and a carriage supporting said rotary member and said drive device and operable to run on a rail extending in the longitudinal direction of said main reinforcement from said main reinforcement supporting and rotating device.

17. An apparatus for manufacturing a reinforcing bar cage according to claim 10, wherein said apparatus further comprises one or more auxiliary supporting devices for rotatably supporting a lower side of said reinforcing bar cage supported between said main reinforcement supporting and rotating device and said main reinforcement pull-out device while allowing rotation of said reinforcing bar cage, said auxiliary supporting devices being disposed along a path of said main reinforcement pull-out device and being vertically movable between a position for supporting said reinforcing bar cage and a returned position not impeding the movement of said main reinforcement pull-out device.

18. An apparatus for manufacturing a reinforcing bar cage according to claim 17, wherein each of said auxiliary supporting devices include a plurality of rollers which can be rotatably in contact with the lower portion of said reinforcing bar cage.

* * * * *